US007900370B1

(12) United States Patent
Treige

(10) Patent No.: US 7,900,370 B1
(45) Date of Patent: Mar. 8, 2011

(54) TAPE MEASURE ATTACHMENT APPARATUS

(76) Inventor: Peter Joseph Treige, Platteville, WI (US)

( * ) Notice: Subject to any disclaimer, the term of this patent is extended or adjusted under 35 U.S.C. 154(b) by 0 days.

(21) Appl. No.: 12/572,095

(22) Filed: Oct. 1, 2009

(51) Int. Cl.
    *G01B 3/10* (2006.01)
(52) U.S. Cl. .......................................................... 33/770
(58) Field of Classification Search .................. 33/486, 33/487, 488, 755, 770
    See application file for complete search history.

(56) References Cited

U.S. PATENT DOCUMENTS

| | | | |
|---|---|---|---|
| 474,111 A | 5/1892 | Bauer | |
| 1,007,400 A | 10/1911 | Speer | |
| 1,110,195 A * | 9/1914 | Erwin | 33/486 |
| 2,591,333 A | 4/1952 | Bellmer | |
| 3,745,663 A | 7/1973 | Dodge | |
| 4,507,869 A | 4/1985 | Stude | |
| 4,603,481 A | 8/1986 | Cohen et al. | |
| 4,827,622 A | 5/1989 | Makar | |
| 4,999,924 A | 3/1991 | Shields | |
| 5,048,197 A | 9/1991 | Anderson | |
| 5,083,380 A * | 1/1992 | Robertson | 33/486 |
| 5,189,801 A | 3/1993 | Nicely | |
| 5,606,803 A | 3/1997 | O'Sullivan | |
| 6,094,833 A * | 8/2000 | Medley, Jr. | 33/770 |
| 6,178,655 B1 | 1/2001 | Potter et al. | |
| 6,349,483 B1 * | 2/2002 | Dodge, Sr. | 33/770 |
| 6,497,050 B1 * | 12/2002 | Ricalde | 33/770 |
| 6,546,644 B2 | 4/2003 | Poineau et al. | |
| 6,663,153 B2 | 12/2003 | Brunson | |
| 6,691,426 B1 | 2/2004 | Lee et al. | |
| 6,839,981 B2 | 1/2005 | Rafter | |
| 6,931,734 B2 | 8/2005 | Elder et al. | |
| 6,996,915 B2 | 2/2006 | Ricalde | |
| 7,159,332 B2 | 1/2007 | Sullivan | |
| 7,263,785 B2 | 9/2007 | Sullivan | |
| 7,509,754 B2 | 3/2009 | Hu | |
| 2006/0236555 A1 * | 10/2006 | Sullivan | 33/770 |
| 2006/0288599 A1 * | 12/2006 | Hajianpour | 33/755 |
| 2009/0090017 A1 * | 4/2009 | Smiroldo | 33/770 |

* cited by examiner

*Primary Examiner* — G. Bradley Bennett
(74) *Attorney, Agent, or Firm* — Wells St. John P.S.

(57) ABSTRACT

An attachment apparatus is provided for a measuring tape having upwardly curving side edges, a downwardly, substantially perpendicular tab at a leading end, and a scale along the length between the side edges. The apparatus includes an end fitting piece and a medial fitting piece. The end fitting piece has a leg and a seat. The leg extends from the piece to provide a measuring edge. The seat is configured to secure with the tab at the leading end of the tape. The medial fitting piece has a leg and a seat. The leg extends from the piece to provide a measuring edge. The seat is configured to mount onto the tape for slidable movement relative to the end fitting leg to define a distance between the measuring edges readable from the scale on the tape.

20 Claims, 11 Drawing Sheets

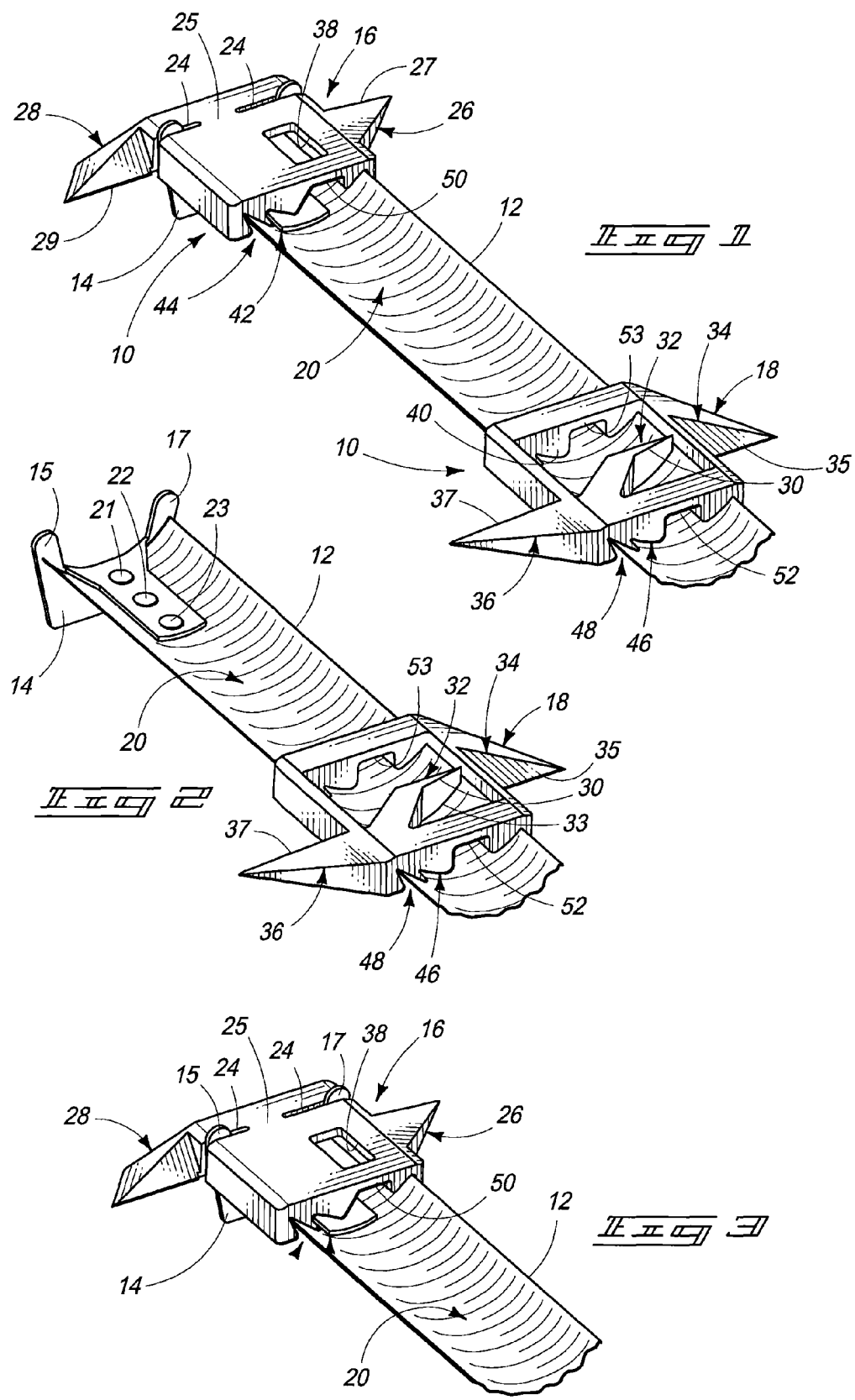

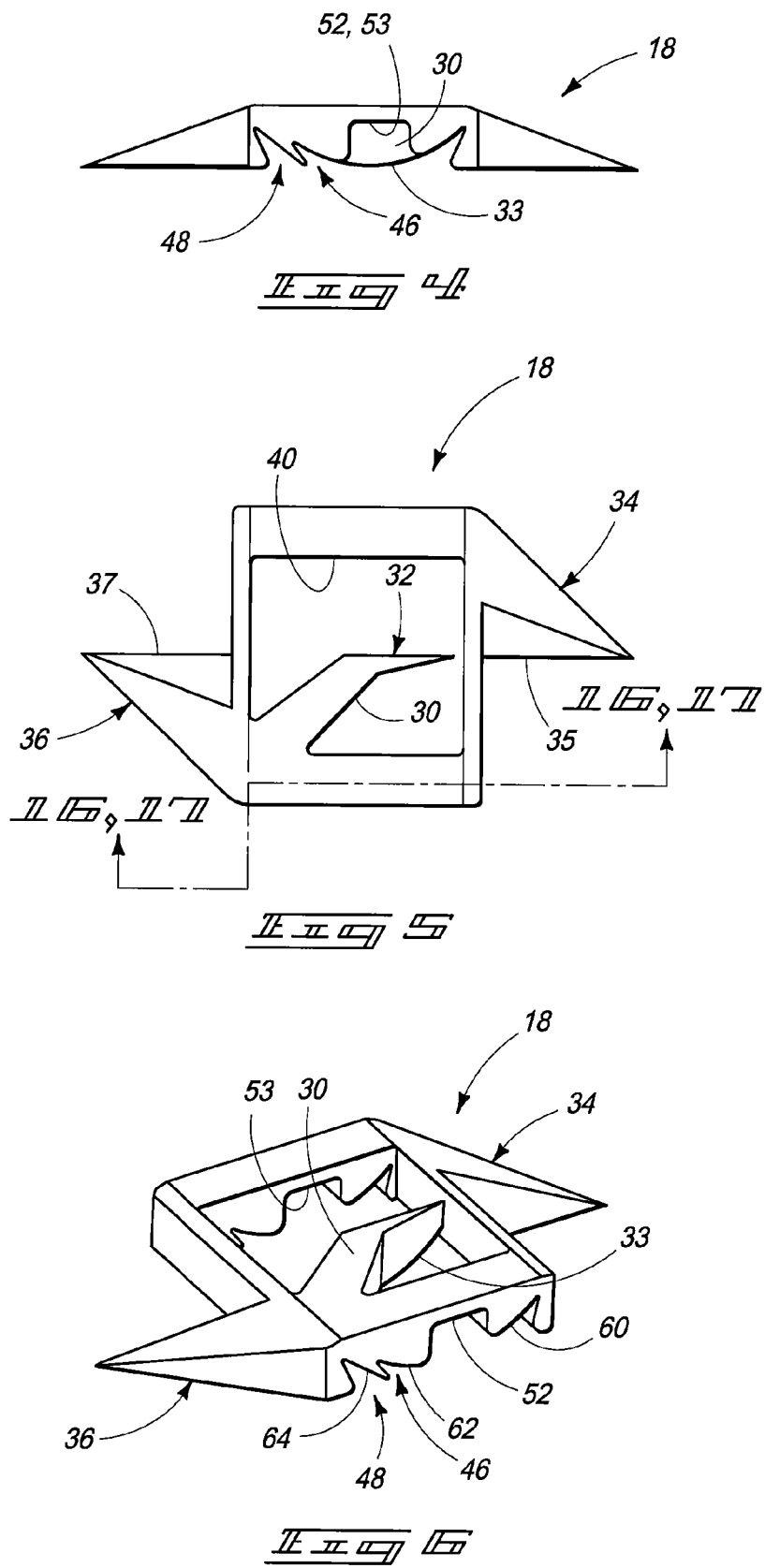

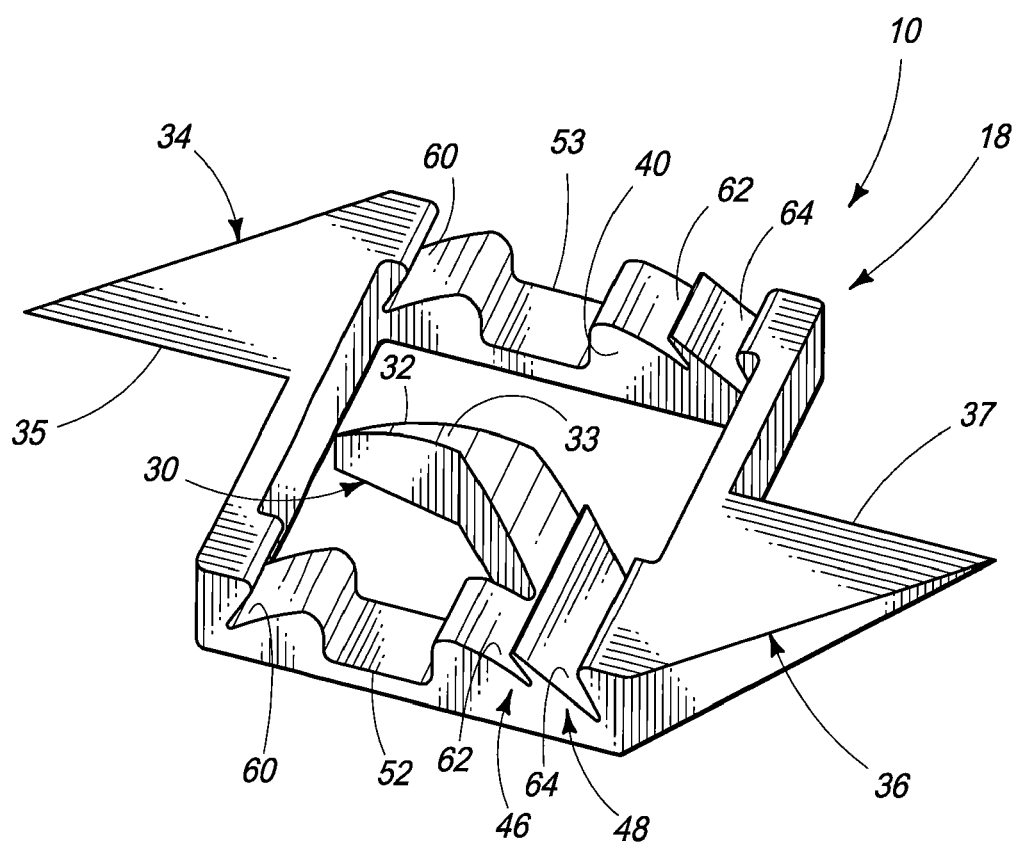

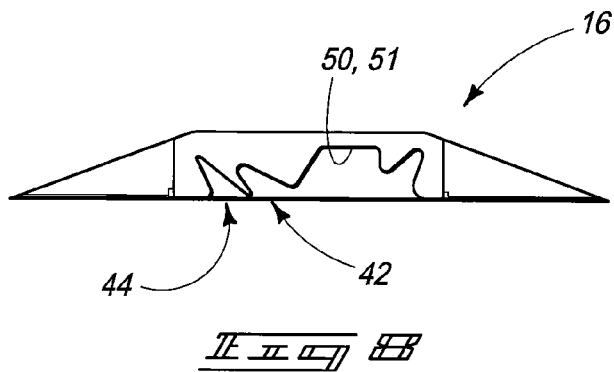
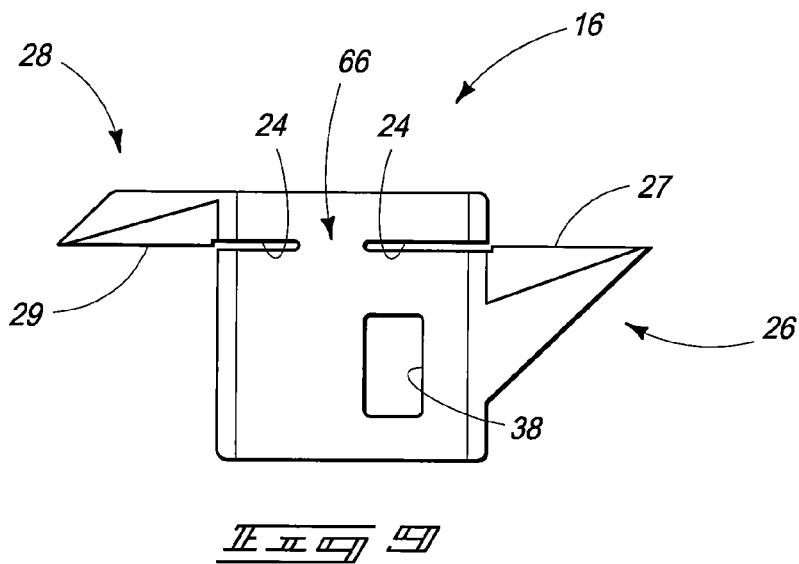
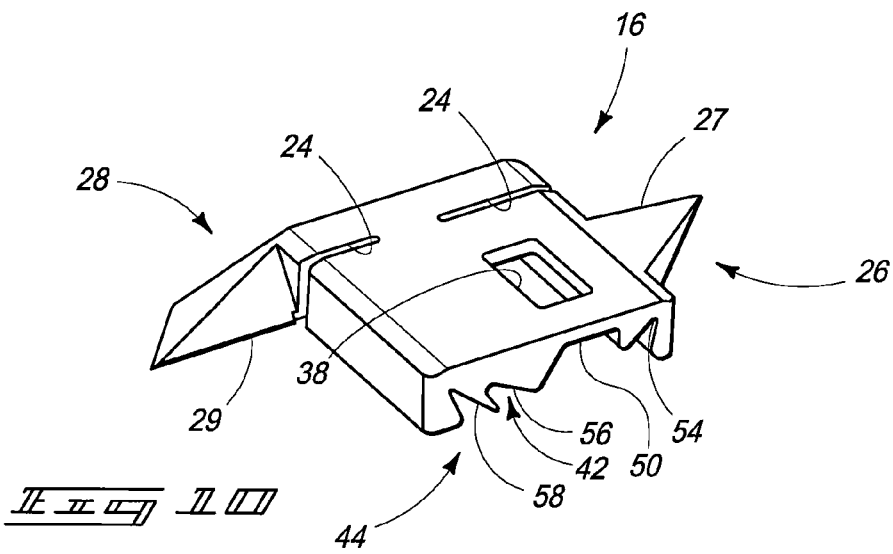

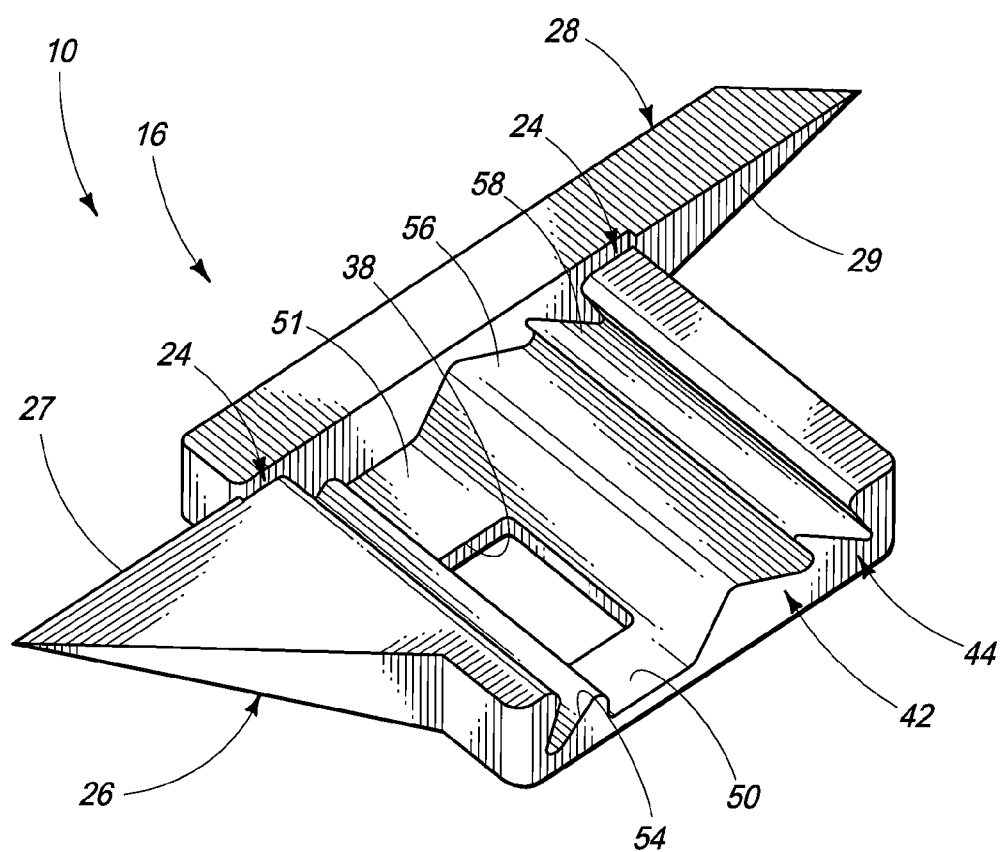

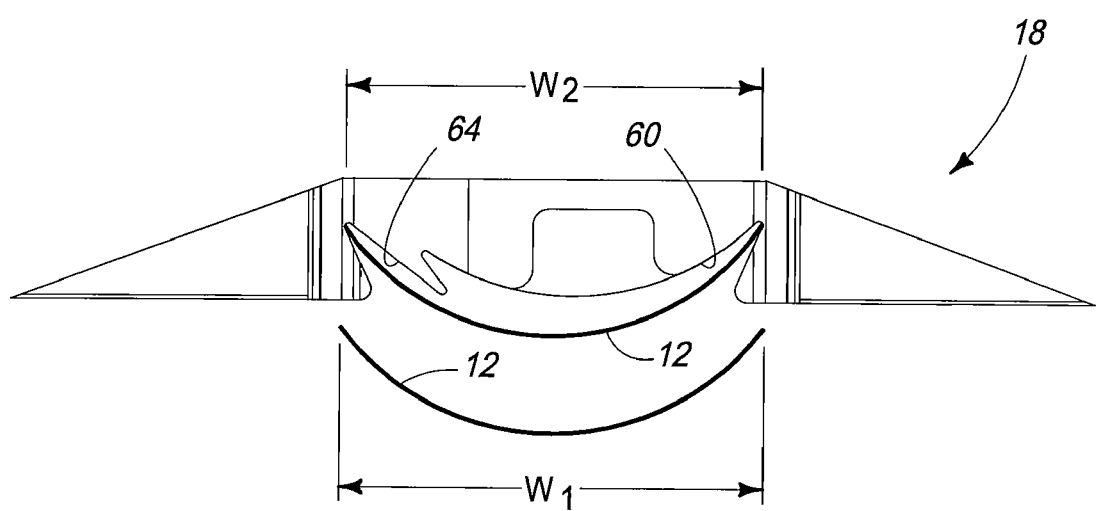

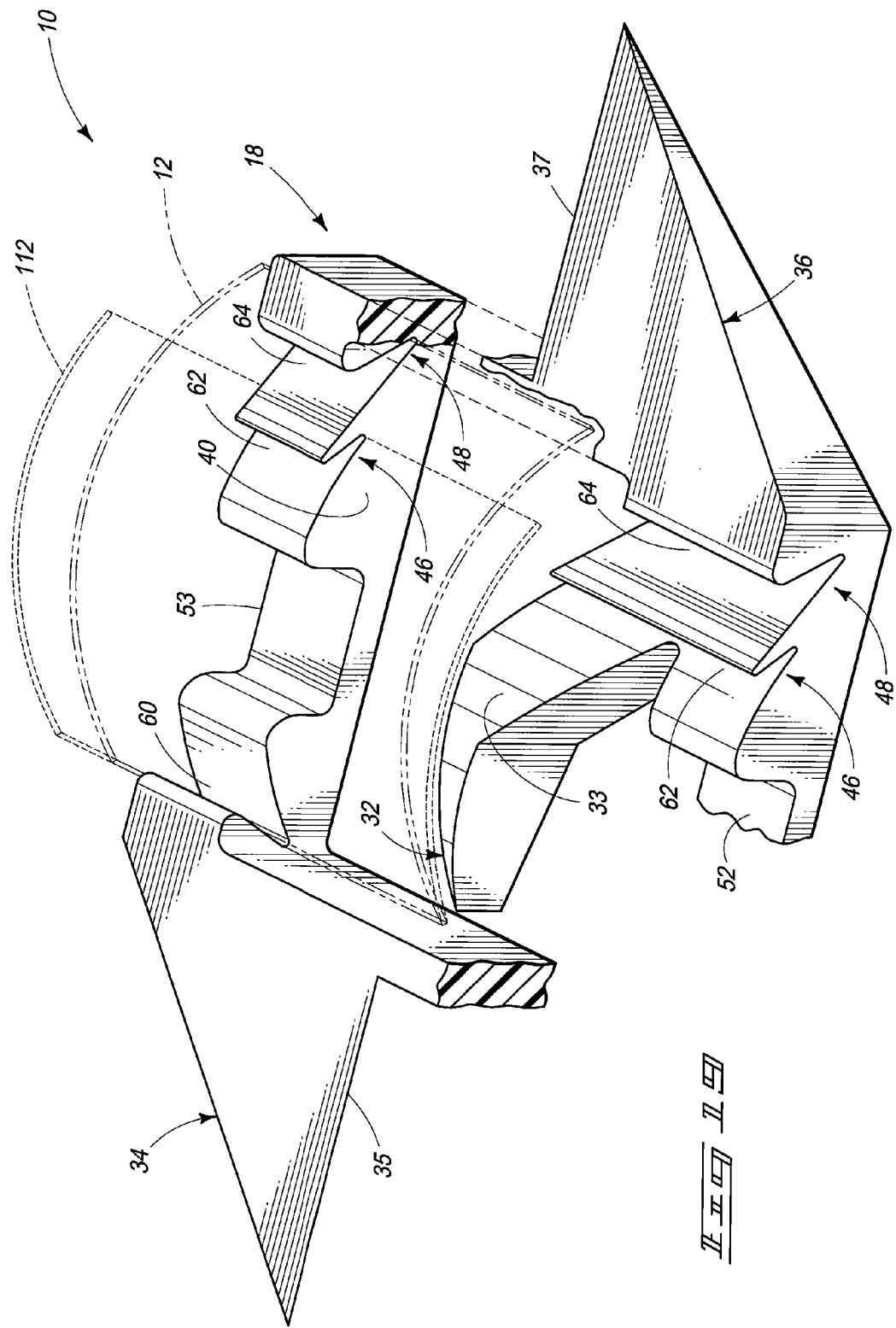

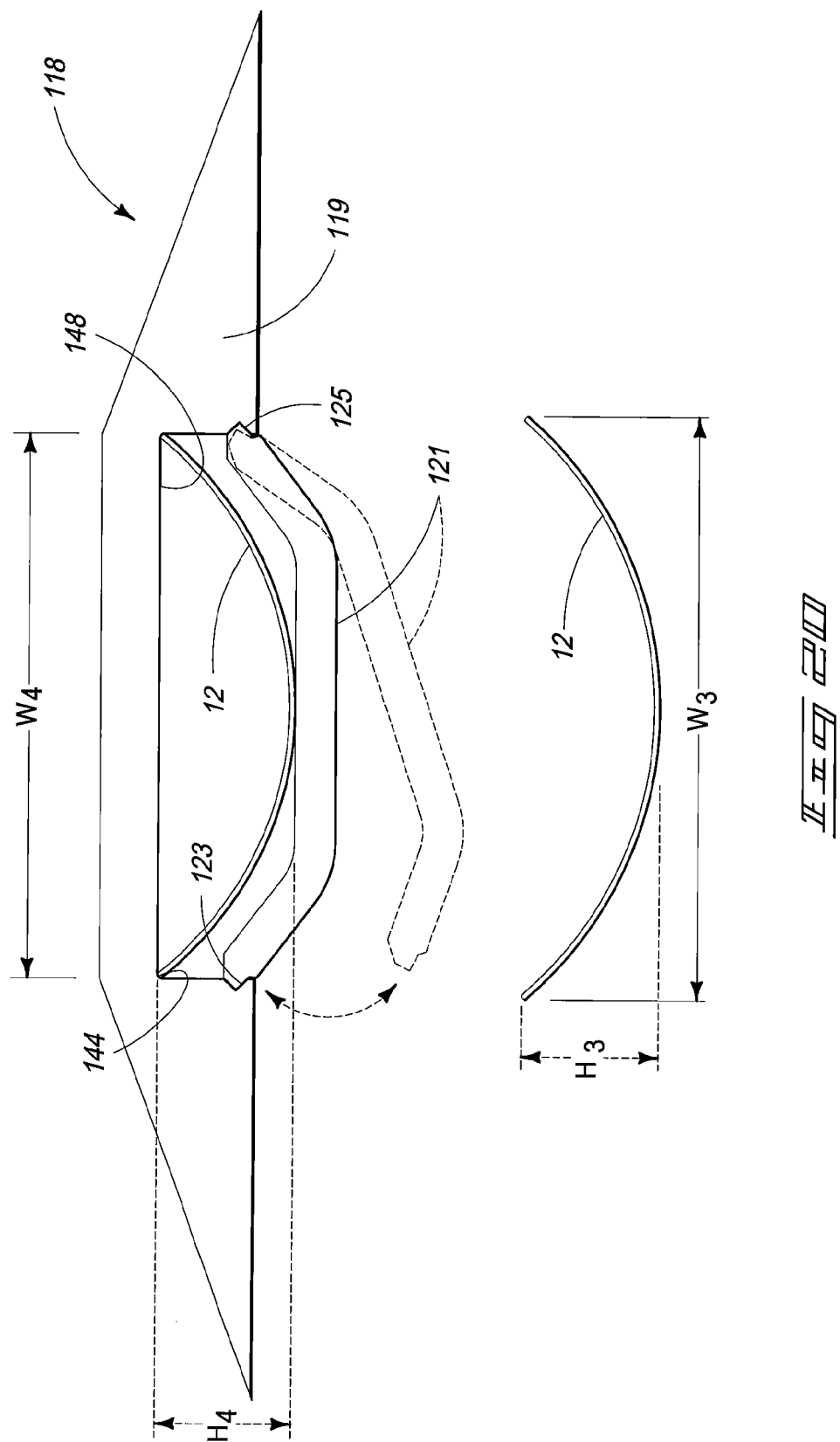

TAPE MEASURE ATTACHMENT APPARATUS

TECHNICAL FIELD

This invention pertains to tape measures and rules. More particularly, the present invention relates to attachment accessories for spring tape measures.

BACKGROUND OF THE INVENTION

Flexible steel tape measures, or spring tape measures, are widely available in varying lengths. One form is provided by a power tape measure having a housing with a slot, a reel, a retraction spring configured to wind the reel, and a tape stored on the reel as a convolute coil. Skilled trades workers and homeowners frequently use such tape measures alike in order to measure distances. However, it is often difficult to accurately determine distance between two objects using an extended tape from a spring tape measure. By itself, an extended tape has a downturned end tab that is supported on the tape to make both inside and outside surface measurements. A scale extends down a concave surface of the extended tape, along which a user visually identifies a location corresponding with the scale in order to determine a measurement between the surface measurement and the location.

In one exemplary use, the tab is seated over a tabletop edge and the tape is extended to overlay an opposite edge of the table, while a user visually notes a scale reading on the tape coincident with the opposite edge of the table. However, it can prove to be difficult to take an accurate measurement for many situations. For example, a contractor faced with measuring inside window dimensions on a row of elevated windows, such as when sizing the windows for blinds, faces difficulty because it will be necessary to climb up a ladder while extending out a tape and visually ascertaining a reading on the tape scale. It can be challenging for a user to visually identify scale markings relative to a location being measured, especially when they are on a ladder. By the time the user has descended the ladder, the scale location can be lost or the reading forgotten. Accordingly, there exists a need for an improved apparatus for clearly demarcating distances that correlate with a scale on a spring tape measure.

SUMMARY OF THE INVENTION

An attachment apparatus for a tape measure is provided for removable attachment to commercially available spring tape measures having a plurality of unique standard widths. In one case, the attachment apparatus accommodates two unique tape widths. However, additional tape widths can be accommodated by providing a unique seat on the apparatus for receiving each uniquely sized tape.

According to one aspect, an attachment apparatus is provided for a measuring tape having upwardly curving side edges, a downwardly, substantially perpendicular tab at a leading end, and a scale along the length between the side edges. The apparatus includes an end fitting piece and a medial fitting piece. The end fitting piece has a leg and a seat. The leg extends from the piece to provide a measuring edge. The seat is configured to secure with the tab at the leading end of the tape. The medial fitting piece has a leg and a seat. The leg extends from the piece to provide a measuring edge. The seat is configured to mount onto the tape for slidable movement relative to the end fitting leg to define a distance between the measuring edges readable from the scale on the tape.

According to another aspect, a measuring apparatus is provided for attachment to a measuring tape having upwardly curving side edges, a leading end, and a scale along a length between the side edges that is concave. The apparatus includes a slide member having a lateral projection and a seat. The projection includes a measuring edge. The seat includes a pair of guide surfaces configured in opposition and spaced apart to receive the tape in an interference fit. The tape is received for urgable and slidable movement along the tape to define/capture a distance on the scale between the measuring edge and the leading end of the tape.

According to yet another aspect, a measuring tape attachment apparatus is provided for a spring tape measure. The measuring tape apparatus includes a stationary end piece and a movable middle piece. The stationary end piece has an arm projecting from the piece and a seat. The arm extends from the piece to provide a measuring edge. The seat is configured to secure onto an end tab of a spring tape measure. The movable middle piece has an arm, a seat, and a reading scale edge. The arm extends from the piece to provide a measuring edge. The seat is configured to mount onto the tape for slidable movement relative to the end piece to ascertain a distance between the measuring edges readable from the reading scale edge on the tape.

BRIEF DESCRIPTION OF THE DRAWINGS

Preferred embodiments of the invention are described below with reference to the following accompanying drawings.

FIG. 1 is a perspective view from above of an attachment apparatus for a spring tape measure having a pair of fitting pieces.

FIG. 2 is a perspective view from above of a movable middle piece provided on the spring tape measure of FIG. 1 illustrating usage of the movable middle piece by itself with the tape.

FIG. 3 is a perspective view from above of the stationary end piece of FIG. 1 mounted onto an end tab of the tape.

FIG. 4 is a front elevational view of the middle piece shown in plan view in FIG. 5.

FIG. 5 is a plan view of the middle piece of FIGS. 1-2 and 4.

FIG. 6 is a perspective view from above of the middle piece of FIGS. 1-2 and 4-5.

FIG. 7 is an enlarged perspective view from below of the middle piece of FIGS. 1-2 and 4-6.

FIG. 8 is a front elevational view of the stationary end piece of FIGS. 1 and 3.

FIG. 9 is a plan view of the stationary end piece of FIGS. 1, 3 and 8.

FIG. 10 is a perspective view from above of the stationary end piece of FIGS. 1, 3 and 8-9.

FIG. 11 is an enlarged perspective view from below of the stationary end piece of FIGS. 1, 3 and 8-11.

FIG. 18 is an enlarged vertical end view of the middle piece and tape blade of FIG. 17 showing the tape blade installed in a slightly deformed state, as well as below in a natural, elongated state while in use.

FIG. 19 is perspective view from below of the middle piece receiving two different width tape blades.

FIG. 20 is a front elevational view of an alternative construction middle piece attachment apparatus.

DETAILED DESCRIPTION OF THE PREFERRED EMBODIMENTS

Figure 12:
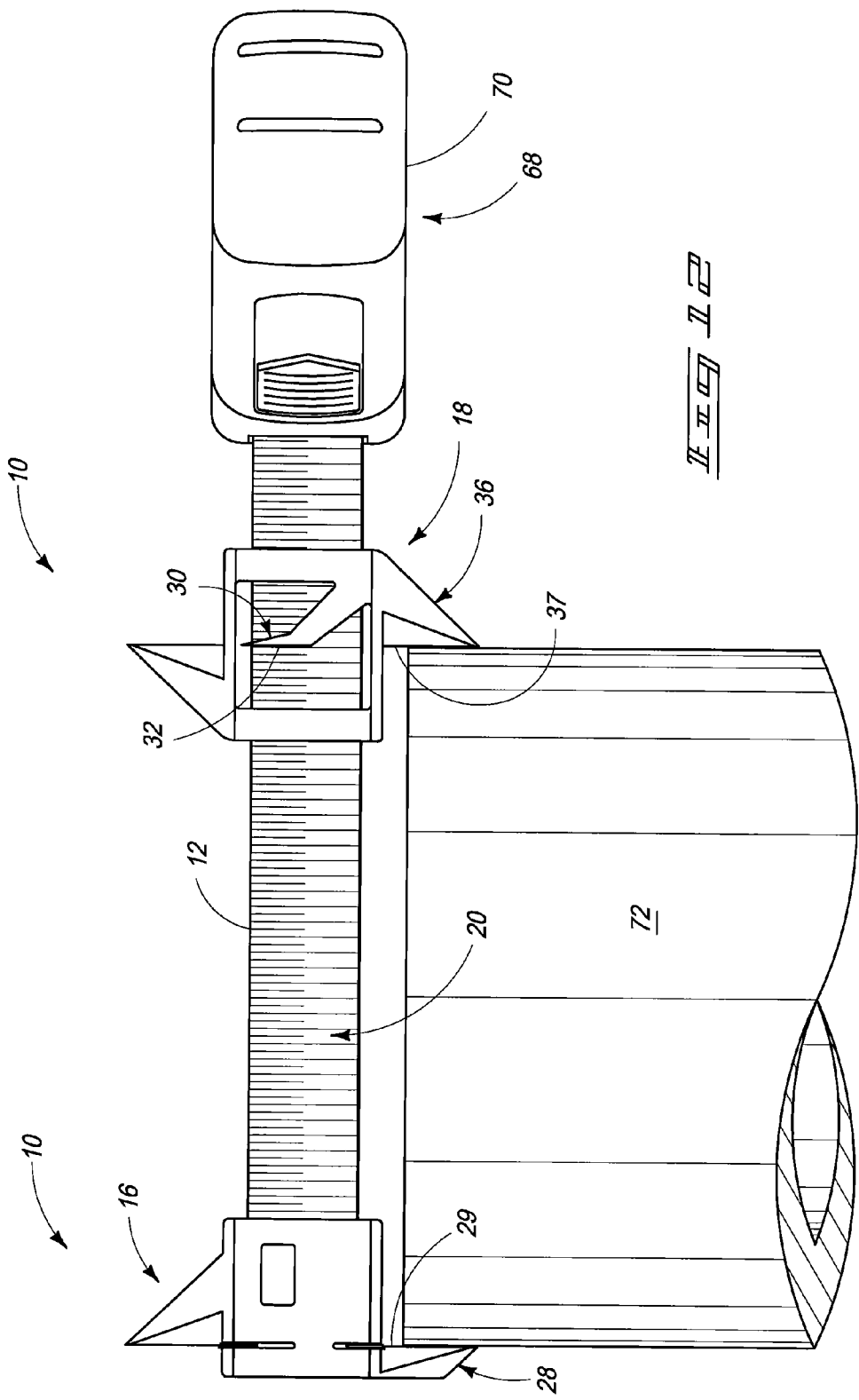
FIG. 12 is a plan view illustrating use of the attachment apparatus of FIG. 1 mounted on a spring tape measure to measure an outer diameter of a cylindrical pipe section.

This disclosure of the invention is submitted in furtherance of the constitutional purposes of the U.S. Patent Laws "to promote the progress of science and useful arts" (Article 1, Section 8).

An attachment apparatus, or system 10 is provided for removable attachment to a tape 12 of a spring tape measure 68 (see FIGS. 12 and 13), such as a power return tape measure, as shown in FIG. 1. Apparatus 10 includes a terminal member, or end piece 16 and a slide member, or middle piece 18 that each fasten and release from a tape, or tape blade 12 of a tape measure (not shown). End piece 16 and middle piece 18 each provide a fitting piece that can be mated and demated with a tape on a spring tape measure having one of two unique widths. Optionally, pieces 16 and 18 can be configured to mate and demate with a single width of tape, or with three or more widths of tape. End piece 16 fastens onto a distal end of tape 12 by securing on to a downturned tab 14 on a distal end of tape 12. Middle piece 18 fastens onto a medial segment of tape 12 where it is retained for slidable repositioning along tape 12.

According to one construction, middle piece 18 has a pair of sliding seats, or tape guide surfaces 46 and 48 that each receives a tape 12 of a corresponding unique width in a slight interference fit by slightly bowing tape 12 to a greater extend than is present when tape 12 is extended in a straight position. A user then urges middle piece 18 to a location where a measurement is to occur, with the slightly deformed tape 12 holding position of middle piece 18 on tape 12. Finger pressure from a user will overcome the grip of middle piece 18 on tape 12, thereby enabling sliding, or repositioning of middle piece 18 along tape 12. Middle piece 18 can be used alone or in combination with end piece 16 on a tape 12 to measure distances.

Also according to one construction, end piece 16 has a pair of stationary seats, or tape retention surfaces 42 and 44 that each receives a tape 12 of a corresponding unique width. An interference fit is provided by seats 42 and 44 relative to a respective tape (such as tape 12) that is received in the seat. According to one construction, end piece 16 has an interference fit with tape 12 that is greater than the interference fit between middle piece 18 and tape 12. This increased interference fit is provided in order to fix end piece 16 relative to an end of tape 12 and to eliminate any motion of tab 14 relative to tape 12. According to one technique, tab 14 is extended out from tape 12 when mating end piece 16 with tape 12. Optionally, seats 42 and 44 can have a width that merely receives a tape without allowing a loose fit. End piece 16 also has a u-shaped slot 24 that extends about a peninsula 25, and is configured to further prevent end piece 16 from sliding on tape 12.

As shown in FIG. 1, apparatus 10 can be used to measure both inside and outside dimensions using respective inside legs, or arms 26 and 34 and outside legs, or arms 28 and 36 on pieces 16 and 18, respectively. A measuring edge 27, 35 and 29, 37 is provided by a vertical surface on each leg 26, 34 and 28, 36 of pieces 16 and 18, respectively. Middle piece 18 is slid along tape 12 until the respective pair of measuring edges 27, 29 and 35, 37 on pieces 16 and 18 conform to a distance being measured. Measuring edges 27 and 35 are used to measure inside dimensions, whereas measuring edges 29 and 37 are used to measure outside dimensions, as explained below in greater detail with reference to FIGS. 12 and 13.

Pairs of relief channels 50, 51 (see FIG. 11) and 52, 53 are provided along seats 42, 44 and 46, 48 of pieces 16 and 18 to facilitate elastic deformation when mounting a tape 12 onto end piece 16 and middle piece 18. Provision of apertures 38 and 40 in pieces 16 and 18, respectively, further facilitates such elastic deformation, or flexing, when loading a tape into a respective seat. According to one construction, pieces 16 and 18 are constructed from a plastic, such as DELRIN® or NYLON®, and relief channels 50-53 facilitate a modest amount of flex in order to further facilitate loading of a tape 12 into a respective seat 42,44 and 46,48 of pieces 16 and 18, respectively. Optionally, pieces 16 and 18 can be constructed from any of a number of rigid or elastic materials, such as metals, composites, or other suitable structural materials. Further optionally, each can be constructed from multiple pieces that join together. However, for the case of a rigid material it will be more difficult to load and unload pieces 16 and 18 from a tape 12.

As shown in FIG. 1, middle piece 18 includes a measuring finger, or leg 30 extending within aperture 40. A transverse side of leg 30 that is perpendicular to a central axis of tape 12 forms a reading scale edge 32. Leg 30 has a curved, or convex underside surface 33 that is provided in proximity with a scale 20 on a concave top surface of tape 12, as shown in FIG. 2. Surface 33 conforms substantially with a tape 12 that is mated with middle piece 18. In this manner, reading scale edge 32 extends in close proximity with scale 20, enabling more accurate reading of individual demarcations on scale 20 by a user, while reducing any parallax.

As shown in FIG. 2, middle piece 18 is mounted onto tape 12 for taking measurements relative to tab 14. By placing tab 14 against an inside surface of an object, middle piece 18 can be slid until measuring surface 35 engages with an opposed inside surface. Distance is then measured by reading the position of reading scale edge 32 relative to scale 20. Likewise, tab 14 can be engaged with an outside surface and middle piece 18 can be slid along tape 12 until measuring surface 37 engages with an opposed outer surface. Additionally, wings 15 and 17 of tab 14 can be used to mark inside and outside measurements relative to the corresponding measuring surfaces 35 and 37 of middle piece 18. Optionally, end piece 16 can be loaded onto tape 12 and tab 14, as shown in FIG. 1, in order to measure distances.

FIG. 3 illustrates end piece 16 mounted onto tape 12 and tab 14. More particularly, tape is received into tape guide 44 with an interference fit. For the case of a narrower tape, the tape would be received into narrower tape guide 42 in a similar interference fit. In addition, wings 15 and 17 are inserted into a u-shaped slot 24 in end piece 16 to prevent end piece 16 from sliding along tape 12. Slot 24 envelopes a central bridge 25 of end piece 16. End piece 16 is received such that measuring edges 27 and 29 correspond with a "zero"

reading on scale 20 of tape 12. Aperture 38 and relief channels 50 and 51 (see FIG. 11) facilitate flexing of end piece 16 to help load tape 12 into seat 44 (or optionally, seat 42). During loading, tape 12 is also flexed, or deformed to facilitate loading into seat 44. Accordingly, an interference fit is generated that holds end piece 16 rigidly onto tape 12.

Figure 14:
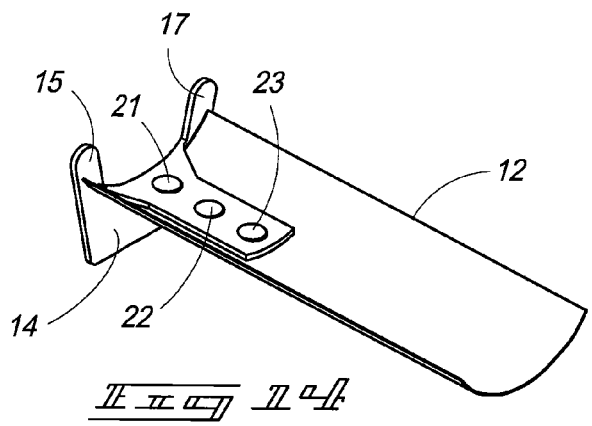
FIG. 14 is a perspective view of a tape and end tab for a spring tape measure.
Figure 15:
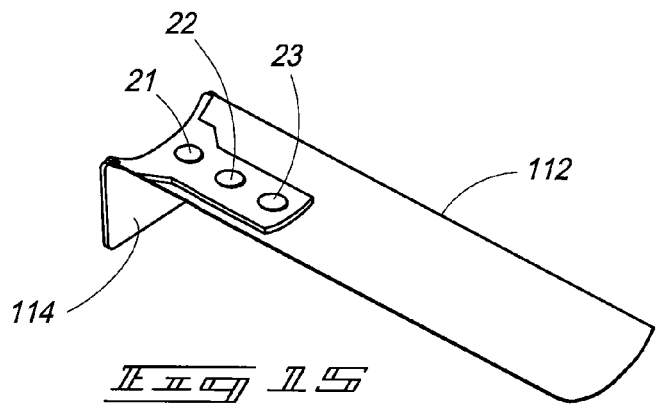
FIG. 15 is a perspective view of a tape with an alternate end tab for a spring tape measure.

As shown in FIG. 2, tab 14 is formed from a piece of steel that is bent at a right angle. A plurality of rivets 21-23 mount tab 14 onto an end of tape 12 via three corresponding slightly elongated holes (not shown), as shown in FIGS. 2 and 14-15. Each hole is elongated a distance equal to the thickness of the downwardly bent end of tab 14. In this way, tab 14 slides fore and aft a distance equal to the thickness of the tab relative to tape 12. Accordingly, when an end of tab 14 is pushed against an inside surface, tab 14 slides a distance equal to a thickness of tab 14. When tab 14 is placed on an outside surface, or edge, the tape is pulled, which causes tab 14 to move, or slide outward a same distance as the thickness of tab 14, thereby accommodating the thickness of tab 14 when taking inside and outside measurements relative to scale 20 on tape 12.

FIGS. 4-7 illustrate in greater detail one construction for middle piece 18. More particularly, provision of tape guides, or seats 46 and 48 are seen in end-view in FIG. 4. Seat 46 is sized to snuggly receive in a sliding, interference fit a tape measure having a nominal 1.00" width (when uncurled, or flattened out). Seat 48 is sized to snuggly receive in a sliding, interference fit a tape measure having a nominal width of 1.25" width (when uncurled, or flattened out). It is understood that provision can be made to add another width, or to provide different unique widths my merely sizing seats with corresponding widths. Furthermore, it is understood that the degree of interference fit, as discussed below in greater detail with reference to FIG. 18 can be varied, depending on the stiffness of a steel tape measure being used with the middle piece 18. It is desired to eliminate any looseness or play between middle piece 18 and a tape in order to facilitate reading of a tape scale without risk of inadvertent movement between piece 18 and a tape after positioning of piece 18 to mark a distance along a tape. Optionally, a conforming, snug, or zero-tolerance fit can be provided between middle piece 18 and tape 12, and a relatively high coefficient of friction surface interface can be provided on seat 46 and 46, such as a textured or rubberized surface finish.

FIGS. 4 and 6-7 show a curved underside 33 of leg 30 that substantially complements a concave surface of a tape that is mated with one of seats 46 and 48. Provision of curved, or arcuate underside 33, as shown in FIG. 3, reduces parallax when sighting reading scale edge 32 (see FIG. 5) to read a scale on a tape (not shown). As shown in FIG. 5, measuring edges 35 and 37 are aligned with reading scale edge 32 on a line that is perpendicular to a central axis of a tape measure mounted onto piece 18. Rectangular aperture 40, provided within a generally rectangular body of piece 18, enables viewing of reading scale edge 32 along with a tape provided there under (not shown).

FIGS. 4, 6 and 7 illustrate relief channels 52 and 53 provided on opposite sides of aperture 40. Channels 52 and 53 cooperate to impart a limited amount of flexibility to piece 18 sufficient to enable loading of a tape into seat 46 or 48. It is understood that a steel tape is also flexed during assembly with piece 18, as described below in greater detail with reference to FIG. 18.

As shown in FIGS. 6 and 7, seat 46 comprises a pair of opposed v-shaped grooves, or arcuate channels 60 and 62. Likewise seat 48 comprises a pair of opposed v-shaped grooves, or arcuate channels 60 and 64. Furthermore, lateral projections, or legs 35 and 36 each comprise compound wedges that form a sharp measuring edge 35 and 37, respectively, as shown in FIGS. 5-7.

FIGS. 8-11 illustrate in greater detail one construction for end piece 16. More particularly, provision of tape guides, or seats 42 and 44 are seen in end-view in FIG. 8. Seat 42 is sized to snuggly receive in an interference fit a tape measure having a nominal 1.00" width. Seat 44 is sized to snuggly receive in an interference fit a tape measure having a nominal width of 1.25" width. It is understood that provision can be made to add another width, or to provide different unique widths my merely sizing seats with corresponding widths. Furthermore, it is understood that the degree of interference fit, as discussed below in greater detail with reference to FIG. 18, can be varied, depending on the stiffness of a steel tape measure being used with the end piece 16. It is desired to eliminate any looseness or play between end piece 16 and a tape in order to facilitate reading of a tape scale without risk of inadvertent movement between piece 16 and a tape end portion when marking a distance along a tape.

As shown in FIGS. 9-11, u-shaped slot 24 extends about bridge piece 66 (see FIG. 9). Slot 24 is aligned along a common axis with measuring edges 27 and 29 of legs 26 and 28, respectively.

As shown in FIGS. 8 and 10-11, relief channels 50 and 51 are provided on opposite sides of aperture 38. Channels 50 and 51 cooperate to impart a limited amount of flexibility to piece 16 sufficient to enable loading of a tape into seat 42 or 44. It is understood that a steel tape is also flexed during assembly with piece 16. Aperture 38, as shown in FIGS. 9-11, further facilitates flexing of piece 16 when loading a tape onto piece 16.

As shown in FIGS. 10-11, seat 42 comprises a pair of opposed v-shaped grooves, or arcuate channels 54 and 56. Likewise seat 44 comprises a pair of opposed v-shaped grooves, or arcuate channels 54 and 58. Furthermore, lateral projections, or legs 26 and 28 each comprise compound wedges that form a sharp measuring edge 27 and 29, respectively, as shown in FIGS. 9-11.

FIG. 12 illustrates a spring tape measure 68 using attachment apparatus 10 of FIG. 1 being used to measure an outside diameter of a cylindrical pipe 72. During use, a user typically grasps onto a housing 70 of measure 68 while tape 12 is extended from housing 70. Such a tape 12 is generally self-supporting when extended, and is typically made from steel, such as steel or stainless steel. End piece 16 is hooked onto an outer surface of pipe 72 with measuring surface 29 on leg 28, while tape 12 is tensioned. Middle piece 18 is then slid, or urged until measuring surface 37 of leg 36 contacts an opposite surface of pipe 72 corresponding with an outer diameter of pipe 72. A user then visually identifies a reading on scale 20 of tape 12 using reading scale edge 32 on leg 30.

Figure 13:
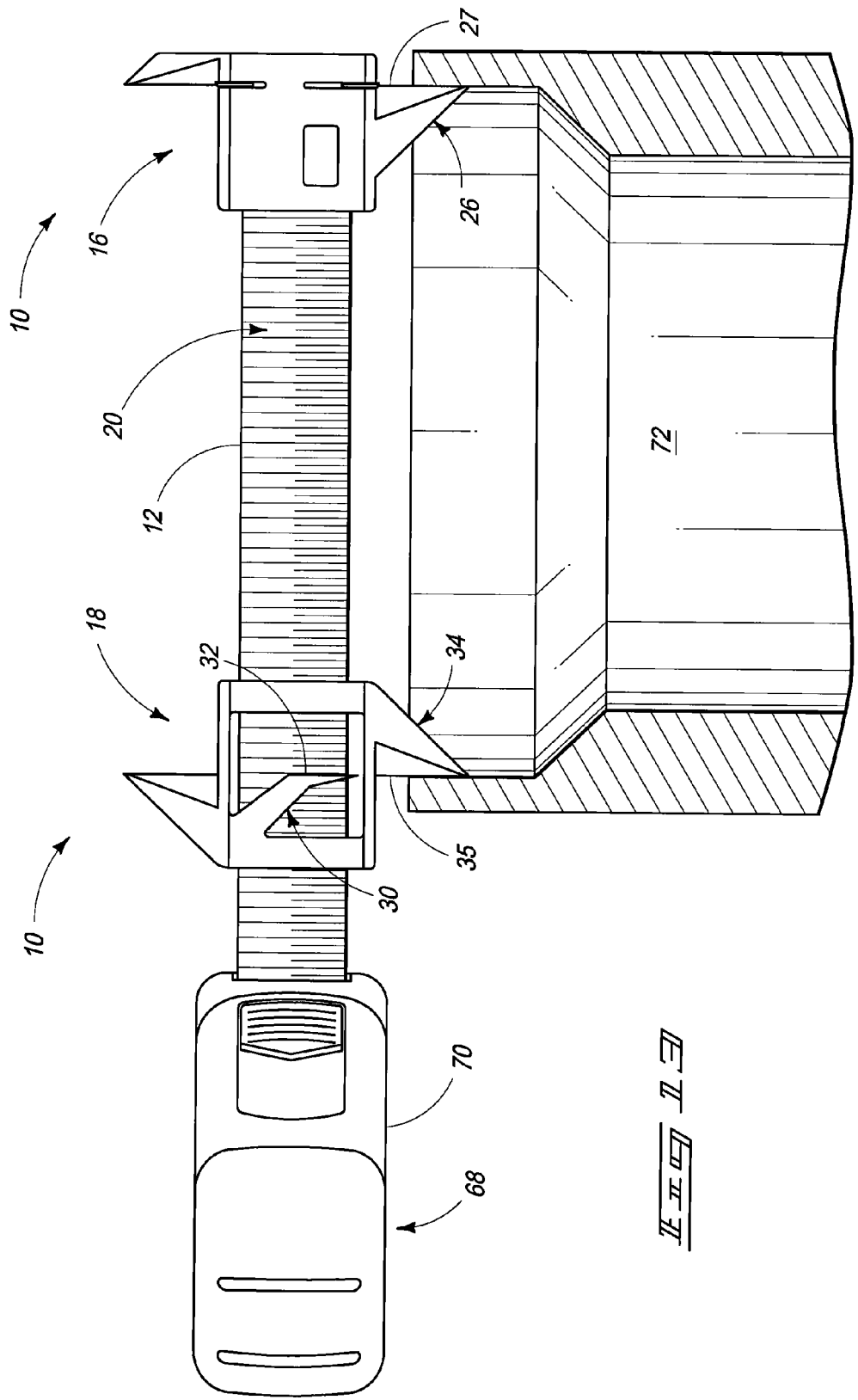
FIG. 13 is a plan view illustrating use of the attachment apparatus of FIGS. 1 and 12 mounted onto a spring tape measure to measure an inner diameter of a cylindrical pipe section.

FIG. 13 illustrates spring tape measure 68 using attachment apparatus of FIGS. 1 and 12 being used to measure an inside diameter of cylindrical pipe 72. End piece 16 is engaged with an inner surface of pipe 72 with measuring surface 27 on leg 26 and held in contact to engage the inner surface. Middle piece 18 is then slid, or urged until measuring surface 35 of leg 34 contacts an opposite inner surface of pipe 72 corresponding with an inner diameter of a surface within pipe 72. A user then visually identifies a reading on scale 20 of tape 12 using reading scale edge 32 on leg 30.

FIG. 14 illustrates a terminal end portion of tape 12 with a first configuration for tab 14 having a pair of wings 15 and 17. In FIG. 2, tab 14 is shown mated with end piece 16.

FIG. 15 illustrates a terminal end portion of tape 112 with an alternative configuration for tab 114. This alternative construction for tab 112 does not have any wings, but can still be mated with end piece 16 (of FIG. 3).

Figure 16:
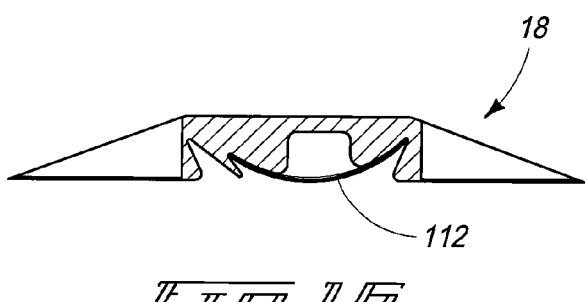
FIG. 16 is a vertical sectional view of the middle piece taken along line 16-16 of FIG. 5 and showing a tape blade with a first width.
Figure 17:
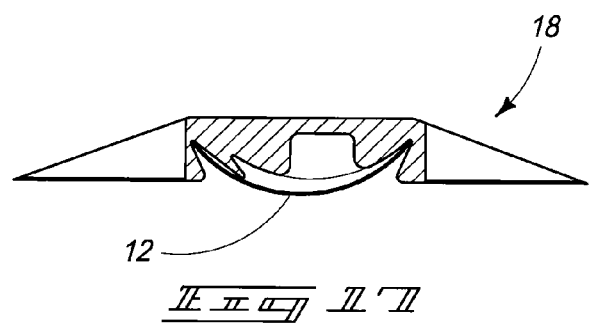
FIG. 17 is a vertical sectional view of the middle piece taken along line 17-17 of FIG. 5 and showing a tape blade with a second width.

FIG. 16 depicts middle piece 18 in vertical sectional view as taken in FIG. 5. A relatively narrow 1.00" width metal tape 112 is shown received onto middle piece 18. In contrast, FIG. 17 depicts middle piece 18 in vertical sectional view as taken in FIG. 5. A relatively wider 1.25" width metal tape 12 is shown received onto middle piece 18.

FIG. 18 illustrates width of a tape 12 prior to being mated with middle piece 18, as well as after being mated with middle piece 18. Tape 12 has a width, in a natural unrolled condition, of $W_1$. Tape 12 has a width, when mated in an interference fit with piece 18, of $W_2$. $W_1$ is greater than $W_2$, according to one construction. Hence, an interference fit helps piece 18 maintain a desired position along a tape to stabilize piece 18 while reading the scale, thereby minimizing any movement during reading that might cause a measurement error.

FIG. 19 shows middle piece 18 of apparatus 10 in enlarged breakaway, perspective view with two sizes of tape 12 and 112 being received alternately in seats 48 and 46, respectively. Seat 46 is provided by channels 60 and 62, whereas seat 48 is provided by channels 60 and 64. A substantially conforming curvature of curved underside 33 places reading scale edge 32 in close proximity with a received tape 12 or 112 so as to reduce any parallax when reading a corresponding scale on the respective tape 12 or 112.

FIG. 20 illustrates an alternative construction for an apparatus of the present invention comprising a middle piece 118 having a main body 119 and a bottom cover 121. Bottom cover 121 secures to body 119 in snap-fit relation with a pair of overlapping edge connections 123 and 125. A generally rectangular inner surface provides a seat 148 that engages with and deforms tape 12 from a natural, extended shape. Tape 12 has an undeformed horizontal dimension, $W_3$, and a deformed, or interference fit dimension, $W_4$. $W_3$ is greater than $W_4$. Furthermore, tape 12 has an undeformed vertical dimension, $H_3$, and a deformed, or interference fit dimension, $H_4$. $H_3$ is greater than $H_4$. Hence, tape 12 is deformed by constraining an unrolled shape of tape 12 in two dimensions using middle piece 18.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. An attachment apparatus for a measuring tape having a curved cross-sectional profile with side edges, a downwardly, substantially perpendicular tab at a leading end, and a scale along the length between the side edges, the apparatus comprising:
an end fitting piece having a leg and a seat, the leg extending from the piece to provide a measuring edge, and the seat configured to secure with the tab at the leading end of the tape; and
a medial fitting piece having a leg and a seat, the leg extending from the piece to provide a measuring edge, and the seat configured to mount onto the tape for slidable movement relative to the end fitting leg to define a distance between the measuring edges readable from the scale on the tape.

2. The apparatus of claim 1, wherein the measuring edge of the end fitting piece and the measuring edge of the medial fitting piece each comprise a leg projection configured to measure an inside edge.

3. The apparatus of claim 1, wherein the measuring edge of the end fitting piece and the measuring edge of the medial fitting piece each comprise a leg projection configured to measure an outside edge.

4. The apparatus of claim 1, wherein the end fitting piece and the medial fitting piece each comprise a pair of legs extending from the respective piece, each leg having a measuring surface, one leg comprising an inside edge leg projection and another leg comprising an outside edge leg projection.

5. The apparatus of claim 4, wherein each of the inside edge leg projections extends laterally from one side of the end fitting piece and the medial fitting piece, respectively, and each of the outside edge leg projections extends laterally from an opposite side of the end fitting piece and the medial fitting piece, respectively.

6. The apparatus of claim 1, wherein each seat of the end fitting piece and the medial fitting piece comprises a pair of opposed grooves provided in one side of the end fitting piece and the medial fitting piece each configured to receive one of the side edges of the tape.

7. The apparatus of claim 6, wherein each of the opposed grooves is placed in parallel, opposite relation providing a distance having a width less than a distance between the curving side edges of the measuring tape.

8. The apparatus of claim 7, wherein each of the opposed grooves provides an interference fit with the side edges of the measuring tape.

9. The apparatus of claim 1, wherein the medial fitting piece comprises a pair of opposed grooves provided in one side of the medial fitting piece, each groove configured to receive one of the side edges of the tape.

10. A measuring apparatus for attachment to a measuring tape having upwardly curving side edges, a leading end, and a scale along a length between the side edges that is concave, the apparatus comprising:
a slide member having a lateral projection and a seat, the projection including a measuring edge and the seat including a pair of guide surfaces configured in opposition and spaced apart to receive the tape in an interference fit, the tape received for urgable and slidable movement along the tape to define/capture a distance on the scale between the measuring edge and the leading end of the tape.

11. The apparatus of claim 10, wherein the guide surfaces comprise a pair of spaced-apart, parallel grooves provided in opposition to one another.

12. The apparatus of claim 11, wherein each of the grooves comprises an arcuate, v-shaped groove substantially conforming with the curving side edges of the tape.

13. The apparatus of claim 10, wherein the slide member further comprises a measuring leg, a reading scale edge provided by one side surface of the measuring leg and extending perpendicular to the tape.

14. The apparatus of claim 13, wherein the measuring leg includes a curved, convex bottom surface substantially complementary with a concave top surface of a tape that is received in the guide surfaces of the seat.

15. The apparatus of claim 13, wherein the measuring leg is provided within a central aperture of the slide member.

16. A measuring tape attachment apparatus for a spring tape measure, comprising:

a stationary end piece having an arm projecting from the piece and a seat, the arm extending from the piece to provide a measuring edge, and the seat configured to secure onto an end tab of a spring tape measure; and a movable middle piece having an arm, a seat, and a reading scale edge, the arm extending from the piece to provide a measuring edge, and the seat configured to mount onto the tape for slidable movement relative to the end piece to ascertain a distance between the measuring edges readable from the reading scale edge on the tape.

17. The apparatus of claim 16, wherein the movable middle piece comprises a scale indicator leg having the reading scale edge.

18. The apparatus of claim 16, wherein the scale indicator leg has a convex bottom surface configured to substantially conform with a concave top surface of a measuring tape.

19. The apparatus of claim 16, wherein the seat comprises a pair of opposed arcuate, acute angle grooves provided in parallel, opposed facing relation and configured to receive opposite edges of a measuring tape.

20. The apparatus of claim 19, further comprising a third arcuate, acute angle groove in parallel, opposed facing relation with a first of the grooves and parallel and spaced apart relation with a second of the grooves.

\* \* \* \* \*